Nov. 10, 1959     R. G. BAEHR     2,911,781
CONVERTIBLE LAWN MOWER FOR HEDGE CUTTING
Filed Jan. 7, 1957     4 Sheets-Sheet 3
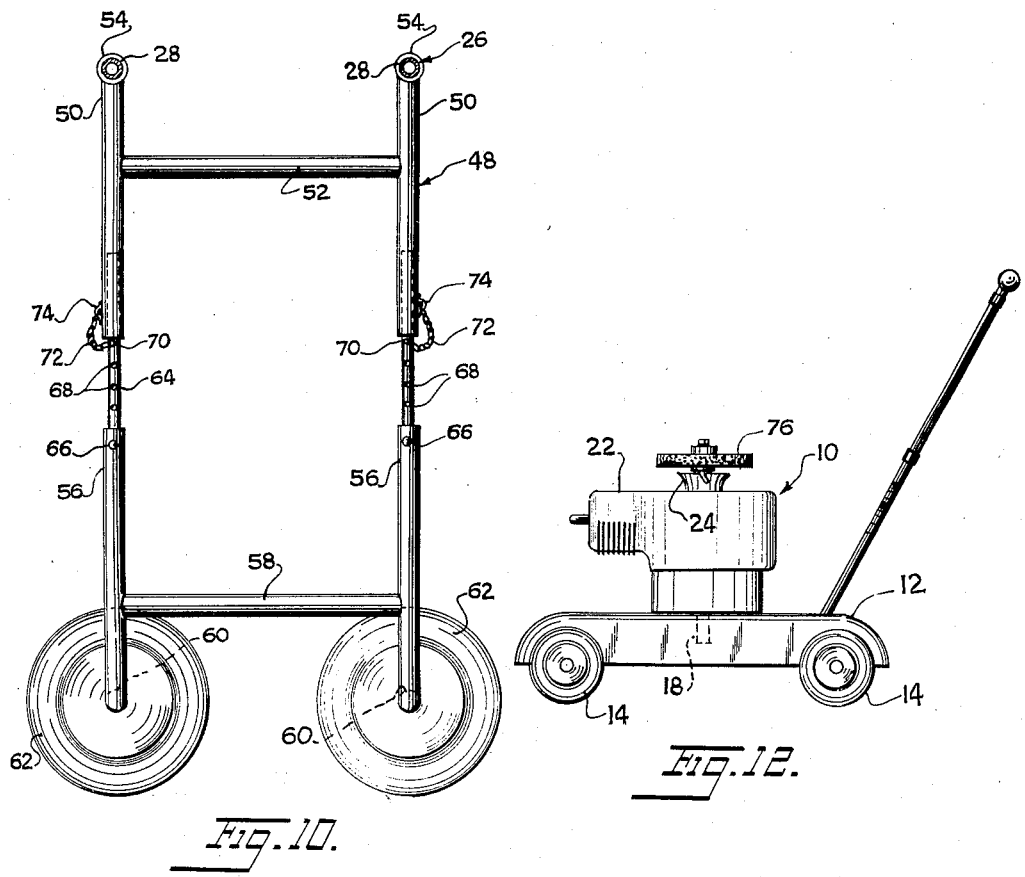
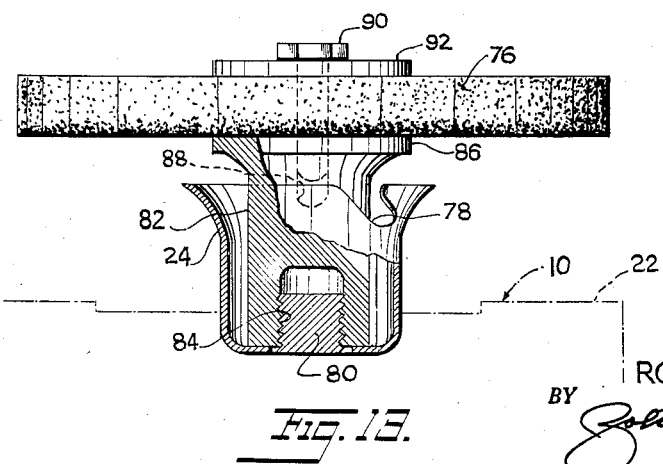
INVENTOR.
ROBERT G. BAEHR
BY
*ATTORNEY*

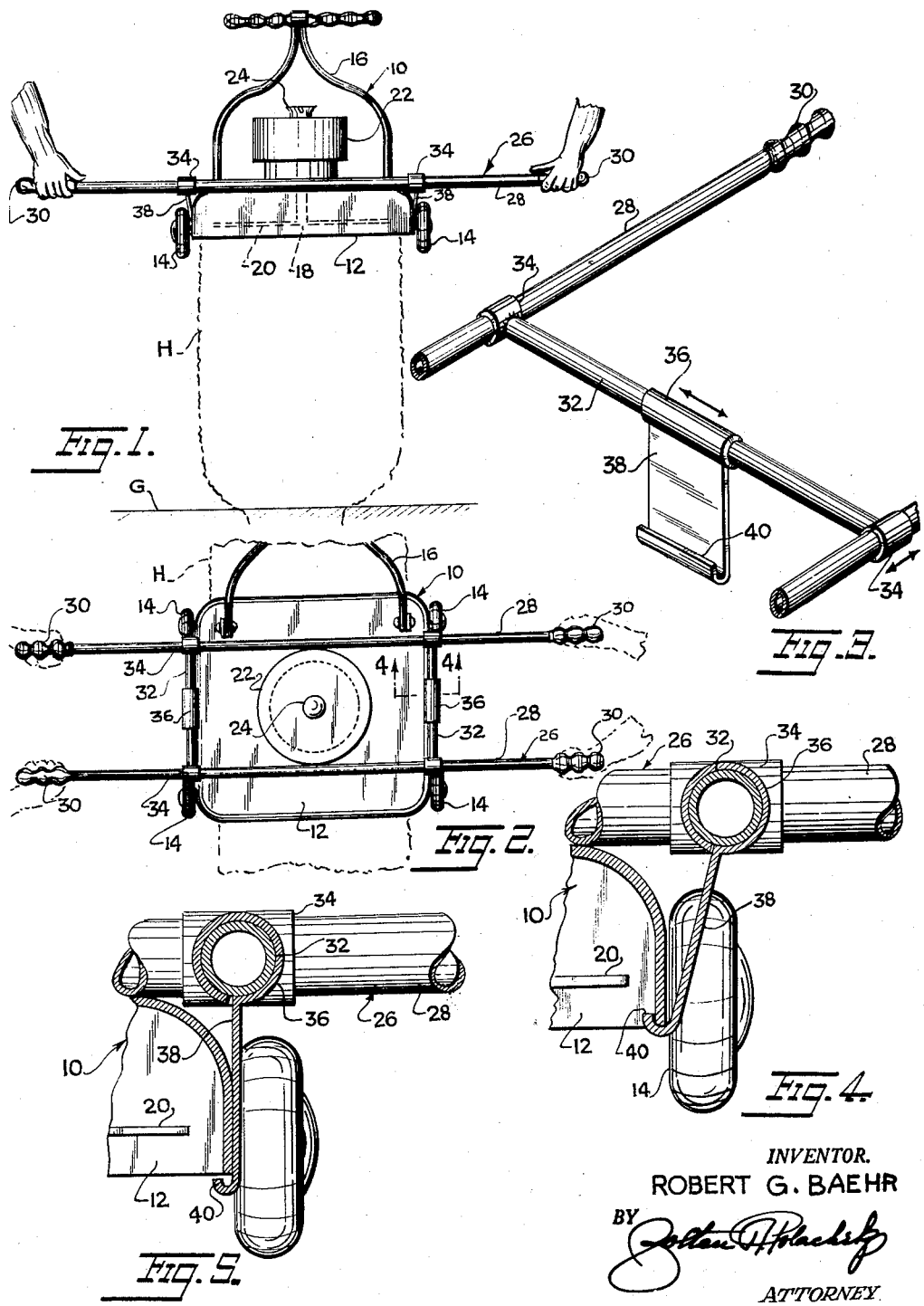

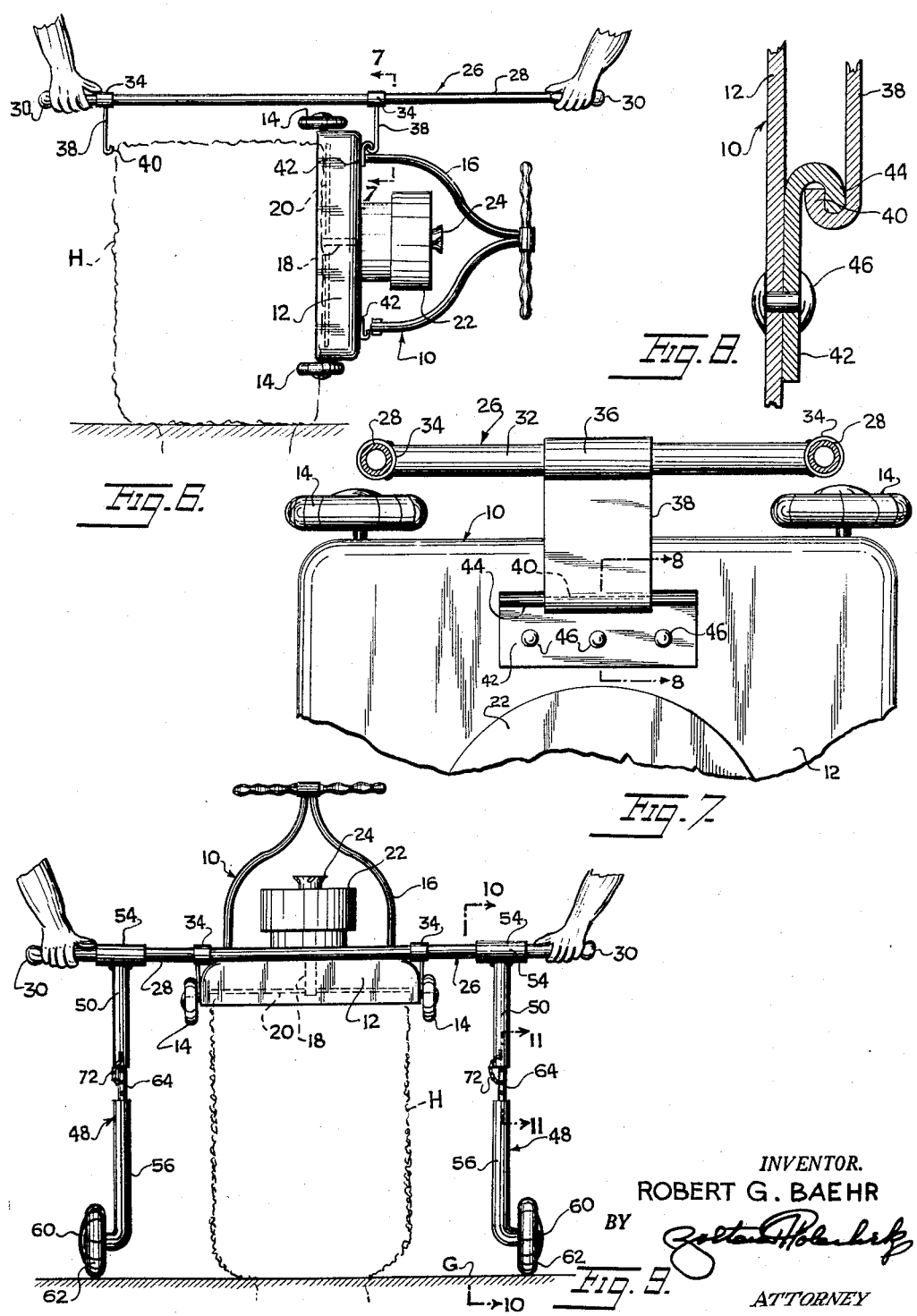

Nov. 10, 1959 R. G. BAEHR 2,911,781
CONVERTIBLE LAWN MOWER FOR HEDGE CUTTING
Filed Jan. 7, 1957 4 Sheets-Sheet 4

INVENTOR.
ROBERT G. BAEHR
BY
ATTORNEY

United States Patent Office 2,911,781
Patented Nov. 10, 1959

2,911,781
CONVERTIBLE LAWN MOWER FOR HEDGE CUTTING

Robert G. Baehr, Kansas City, Mo.

Application January 7, 1957, Serial No. 632,717

2 Claims. (Cl. 56—235)

This invention relates to a construction so designed that a generally conventional rotary lawn mower can be converted for use as a snow scoop, hedge trimmer, or rotary grinder.

One object of importance is to provide a device of the character stated which can be swiftly attached, in a selected adjusted position, to a basically conventional rotary lawn mower, in a manner to permit the lawn mower to be used as a hedge trimmer, cutting uniformly and easily either the top surface of a hedge, or the side surfaces thereof.

Another object is to provide a device of the character stated wherein the means facilitating use of the lawn mower as a herge trimmer will be adjustable in height, whereby to allow the device to be used in trimming hedges of different heights.

A further object is to so form the device that the lawn mower can be mounted either in horizontal position for trimming the top of the hedge, or in vertical positions for trimming the sides of the hedges.

Still another object is to provide, in a modified form of the device, means whereby the sides of the hedge may be trimmed in other than vertical planes, that is, the hedge may be undercut so as to taper downwardly in cross section or alternatively, taper upwardly in cross section, whichever is desired.

Still another object is to provide, in a device of the character stated, means attachable to a lawn mower providing a snow scoop, with an impeller being substituted for the lawn mower blade, forming a rotary suction device adapted to remove snow from the scoop during the forward movement of the structure.

Still another object is to provide, in a snow scoop attachment for a rotary lawn mower, a relative formation and arrangement of the lawn mower housing and the snow scoop, such that a lateral discharge conduit of the structure will be properly located to discharge the snow sucked from the scoop by the rapidly rotating impeller.

Still another object is to provide, in a device of the character described, a relatively inexpensive means for attaching the hedge trimming or snow scoop devices to a conventional mower adapted to operate with its blade in a horizontal or vertical plane, which means will not require substantial modification or redesign of the mower.

Still another object is to provide a lawn mower conversion structure that will be sturdy, relatively inexpensive, and efficient in carrying out its intended functions.

A further object is to provide means for converting a rotary mower to a grinder, so that the blade of the nower can be sharpened directly upon a grinding wheel rotated by the mower motor.

Still another object, in the form of the invention in which the lawn mower is converted for use as a hedge trimmer, is to provide means which can be either held by the users in position to support the mower for cutting or trimming the hedge, or alternatively, can be mounted upon a rollable carriage for supporting the mower in hedge-trimming positions.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of a lawn mower, supported in accordance with the invention in position for trimming the top of a hedge, the hedge being shown in dotted lines.

Fig. 2 is a top plan view of the mower and the support means therefor, in which the hedge is again shown in dotted lines.

Fig. 3 is an enlarged, fragmentary perspective view of the mower support means.

Fig. 4 is a detail sectional view, still further enlarged, on line 4—4 of Fig. 2, showing the mower engaged with the support means.

Fig. 5 is a detail sectional view on the same cutting plane as Fig. 4, in which the support means is shown disengaged from the mower.

Fig. 6 is an elevational view similar to Fig. 1 in which the mower has been arranged for trimming the side of the hedge.

Fig. 7 is an enlarged, detail sectional view substantially on line 7—7 of Fig. 6.

Fig. 8 is a detail sectional view, still further enlarged, showing the connection of the mower to the support means when the mower is to be positioned for trimming the sides of the hedge.

Fig. 9 is a view similar to Fig. 1 in which the support means has been mounted upon a rollable carriage.

Fig. 10 is an enlarged, vertical sectional view on line 10—10 of Fig. 9, showing the carriage.

Fig. 12 is a side elevational view showing the mower converted for use as a rotary grinder.

Fig. 13 is an enlarged view, partly in elevation and partly in section, showing the grinding wheel mounting of the mower, the associated support structure of the mower being shown fragmentarily and in dotted lines.

Figure 14:
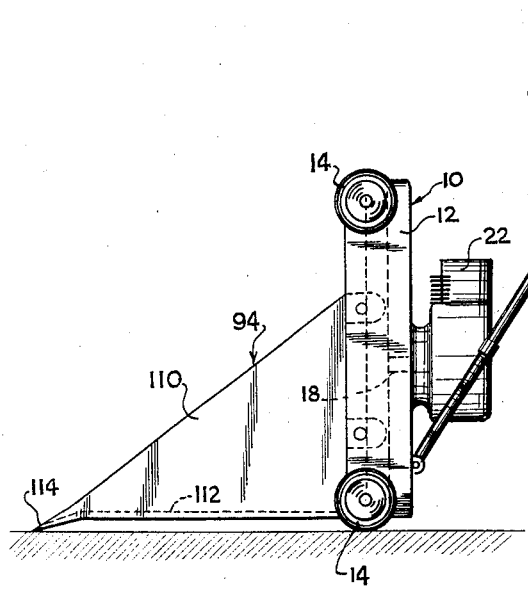
Fig. 14 is a side elevational view showing the rotary mower converted for use as a snow plow.

Referring to the drawings in detail, and in particular to Figs. 1–5, designated generally at 10 is a conventional rotary lawn mower. At this point, it will be understood that the invention can be adapted to any of various makes and sizes of rotary mowers which can operate with their blades in a horizontal or vertical plane, that shown being merely typical of one mower with which the invention may be advantageously used.

In any event, mower 10 includes the usual casing or housing 12, having a substantially flat, generally rectangular top plate integral at its periphery with a depending guard flange or skirt. Mounted upon opposite sides of the guard flange are front and rear wheels 14, and the construction illustrated has the front wheels transversely aligned, with the rear wheels being similarly aligned.

Also provided upon the mower is the usual pivotally adjustable handle 16, the vertically disposed blade shaft 18 extending downwardly within the center portion of the housing 12, the rotary blade 20 detachably connected to shaft 18 for rotation therewith, the motor 22 (which may be either electric or of the internal combustion type) and the cup-shaped starting disc 24, which as usual is notched to receive a rope, not shown, whereby the starter can be manually turned for the purpose of initiating operation of the motor.

All this is conventional construction in a rotary mower, and an important characteristic of the invention is that the mower can be converted for any of various uses to be described in detail hereinafter, without requiring any modification or redesign of the basic construction of the mower, and with little, if any, change in details.

The device for converting the mower for use as a hedge trimmer has been generally designated at 26. This may take various forms, the basic point to be made being that the invention, so far as permitted within the scope of the appended claims, is intended to embrace any of various support devices that can be attached to the mower to permit the same to be used for hedge trimming.

It is, of course, necessary to show at least one structural means, in detail, proposed for carrying out the inventive concept. To this end, the support device 26 is illustrated as having elongated, straight, parallel side rails 28 coextensive in length and formed at their ends for receiving removable rubber grips 30.

Spaced longitudinally of the side rails are crossbars 32, each of which is fixedly connected at its opposite ends to guide sleeves 34 (see Fig. 3), the axes of which are parallel and extend normally to the length of the associated crossbar, the sleeves receiving the rails 28 to slidably mount the crossbars on the rails.

Thus, the crossbars may be slidably adjusted along the length of the rails 28, so as to locate the crossbars selected distances apart. This is of importance, in view of the fact that different makes and sizes of lawn mowers have transverse dimensions that are correspondingly different.

In any event, carried by each crossbar 32 is a support hook assembly, including a sleeve 36 integral with a depending, wide plate 38 formed at its lower end with an upwardly turned flange 40 cooperating with the plate 38 in defining a hook that extends radially from the sleeve 36. A single piece of metal material can be used in forming the sleeve, plate, and flange (see Fig. 4) and the sleeve is not only axially shiftable along the length of the crossbar 32, but also is freely rotatable upon the crossbar as will be readily noted by comparison of Figs. 4 and 5 with each other.

The axial adjustment of the sleeves 36 is for the purpose of locating the support hook assembly wherever desired upon an adjacent side of the mower. This is of value, in view of the fact that one mower might have a forwardly offset rear wheel, necessitating adjustment of the sleeve 36 axially, to locate the sleeve where the hook can engage the adjacent side portion of the depending skirt of housing 12 in the manner shown in Fig. 4.

It will now be noted that to connect the support device to the mower, so that the mower can be used for trimming the top of a hedge H, one merely locates the crossbar 32 at opposite sides of motor 22, with the rails 28 being similarly positioned. The support device is then lowered into engagement with the flat top or main portion of the housing 12, and initially, the sleeve 36 will be disposed directly over the side portions of the guard flange as in Fig. 5. In this position of the parts, the upwardly turned flange 40 will be disposed downwardly from the bottom edge of the housing, and to engage the flange with the guard flange of the housing, it is merely necessary that the sleeve 36 be shifted outwardly from its Fig. 5 to its Fig. 4 position by slidable movement of the sleeves 34 along the rails 28. As a result, the flange 40 is shifted upwardly to hook under the guard flange of the housing. This clampably engages the housing with the support device, without necessity of further connections, and it will be readily perceived that the connection is effected with maximum ease and speed.

Then, one person may grasp the grips 30 at one side of hedge H, with another person being disposed at the other side as shown in Figs. 1 and 2. The lawn mower is supported with its blade 20 rotating a horizontal plane so that the two persons can walk along the hedge, moving the mower horizontally, thus to quickly and easily trim the top of the hedge.

It will be observed that the longitudinal adjustment of the crossbars 32 permits the device to be associated with mowers of any width. Further, the movement of the hook assembly axially of each crossbar permits each hook assembly to be engaged with the side of an associated mower, regardless of the fact that various mowers differ from one another in respect to their size, design, etc.

Still further, the invention is characterized by the ease with which the device can be connected to or disconnected from the mower, this being shown to best advantage in Figs. 4 and 5.

In Figs. 6-8, the device is shown adapted for supporting the mower in position for rotation of the blade 20 in a vertical plane for trimming the side of the hedge. In this arrangement, the support device 26 is used without any modification or redesign thereof. It is merely necessary that there be attached to the housing 12, adjacent each side thereof, hook-shaped wide brackets 42 (see Figs. 7 and 8). Each bracket 42 is in the form of a long, generally rectangular plate, the outer longitudinal edge of which parallels the adjacent side of the lawn mower and is offset inwardly from the side of the mower. On said outer longitudinal edge of the plate of the bracket there is formed a flange or lip 44, adapted to interlockingly engage the mating flange 40 of one of the support hook assemblies of the conversion device.

The bracket plate is fixedly secured to the mower, as for example, by rivets 46 although other fastening means can be employed, including clamps or similar devices that do not require drilling of the housing 12.

In any event, either bracket 42 may be used, according to which side of the hedge is being trimmed. As shown in Fig. 6, one of the support hook assemblies of the conversion device 26 is not needed in these circumstances. The other hook assembly, however, is engaged with the bracket 42 as is illustrated in Fig. 6, and this causes the mower to be supported with its blade 20 rotating in a vertical plane along the side of the hedge H. Again, the mower is moved longitudinally of the edge by two persons grasping opposite ends of the rails 28.

In some circumstances, it will also be possible to trim the sides of the hedge in a manner to undercut the hedge. Or, for that matter, it may be desired to taper the hedge upwardly in cross section rather than downwardly. In these circumstances, the lawn mower can be tilted out of its vertical position, by one grasping the handle 16, the mower tilting upon the axis defined by the supporting hook assembly including hook flange 40. This is believed sufficiently obvious as not to require special illustration herein.

Figure 11:
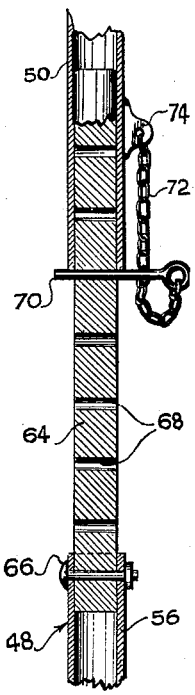
Fig. 11 is a detail sectional view, the scale being still further enlarged, on line 11—11 of Fig. 9 showing the means for adjusting the carriage.

Referring now to Figs. 9-11, it may be desired to support the lawn mower for hedge trimming upon rollable carriages, rather than have the entire weight of the mower supported by the two individuals in the manner previously described herein. The arrangement shown in Fig. 9 is designed to permit this, and has the advantage of not only relieving the users of supporting the weight of the mower, but also of insuring that the mower will remain at a prescribed elevation above the ground, thus to in turn insure accurate trimming of the top of the hedge without necessity of the users continually checking to determine whether they are holding the mower at the desired elevation.

In any event, identical, oppositely arranged carriages 48 are used in this instance, one at each side of the hedge. The support device of Fig. 1 is used without change, and a characteristic of the invention in this regard is that the carriages can be detached or attached, whichever is desired, permitting use of the support device 26 either in the Fig. 1 arrangement or, alternatively, in the Fig. 9 arrangement. The carriages are mounted upon the ends of the rails 28 merely by removing grips 30, to receive guide sleeves provided upon the upper ends of the respective carriages.

Each carriage includes parallel, vertically disposed upper support leg sections 50, and fixedly connected between the sections 50 of each carriage is a horizontally disposed brace bar 52. Sections 50 are of tubular construction, and at the upper ends thereof there are welded or otherwise fixedly secured guide sleeves 54, slidably receiving the side rails 28 in the manner shown in Fig. 9.

Aligned with the respective upper leg sections 50 are tubular lower leg sections 56, between which is fixedly connected a lower brace bar 58. Sections 56, at their lower ends, are integrally formed with horizontally, outwardly projecting stub shafts or axles 60 on which are rotatable ground wheels 62 rolling upon the ground G, providing a lawn mower support structure approximately of inverted U shape as shown in Fig. 9, straddling the hedge, with the mower connected to the rails 28 in the manner already described in reference to Fig. 1. Further, respective carriages 48 can be shifted toward or away from one another along the side rails, this being desirable in view of the fact that various hedges are of different widths. Further, flower beds may be provided adjacent one or the other side of the hedge, in which event it may be desired to locate the ground wheels where they will not damage said bed or beds.

Means are provided for adjusting the height of the carriages, to in turn adjust the distance above the ground at which the blade 20 has its cutting action. This, of course, adapts the device for cutting hedges of different heights and the means referred to is shown in Fig. 11 to particular advantage. As will be noted, in each lower leg section 56 there is mounted an elongated bar 64 secured within section 56 by a bolt 66. Formed in bar 64 are uniformly spaced, diametrically extending openings 68 any of which may receive a drop pin 70 carried by a chain 72 secured to an eye 74 welded to the adjacent upper leg section 50. Bar 64 telescopes within section 50 and it will be apparent that section 50 can be raised or lowered to register the lower end thereof with a selected opening 68, after which the pin 70 is extended through the opening to engage the section 50 and preserve the adjustment.

In Figs. 12 and 13, there is shown a means for converting a lawn mower into a rotary grinder. This is particularly desirable for the purpose of sharpening the blades 20, although of course the rotary grinder can be used for sharpening or grinding any other article. In this event, the conversion device will include a grinding wheel 76 rotating in a horizontal plane above the cup-shaped starter 24. The starter, normally, has an opening in its lower end, receiving a threaded stud projecting upwardly from the motor, said stud projecting upwardly from the cooling shroud that surrounds the flywheel, said shroud being shown fragmentarily and in dotted lines in Fig. 13.

A starter of the type shown has the usual inclined notch 78 adapted to receive the knotted end of the starting rope, not shown, whereby the starter is turned manually until the engine begins to operate. The stud previously referred to is shown at 80, and ordinarily a crankshaft retaining nut is threaded onto the stud, bearing against the bottom wall of the starter 24 to fixedly secure the starter to the crankshaft.

In effecting the conversion of the lawn mower to the rotary grinder, one merely removes the crankshaft retaining nut. Then, in its place one utilizes an adapter 82 having at its lower end an axial, threaded recess 84 receiving stud 80. The adapter is threaded downwardly on the stud 80 until it tightly engages the starter 24, thus holding the starter in place and connecting the adapter, crankshaft, and starter for conjoint rotation.

At its upper end, adapter 82, has a flattened, enlarged head 86, on which grinding wheel 76 is supported. Centrally formed in head 86 is a threaded recess 88, opening upwardly to receive a screw 90, the head of which bears against a washer 92 that is in engagement with the top face of the grinding wheel. When the screw is tightened, the grinding wheel is connected to the adapter for rotation therewith.

The screw 90 can be the conventional lawn mower retaining screw, and washer 92 can be the usual blade retaining washer. In other words, whenever it is desired to sharpen the blade, one may detach the blade by removing screw 90 and washer 92. Then, these components are employed for mounting the grinding wheel in the manner shown. Then, the blade can be held against the grinding wheel for the purpose of sharpening the same. When the blade has been sharpened, screw 90 is removed, together with washer 92 for reattaching the blade to the shaft 18, and this automatically dismounts the grinding wheel.

Figure 16:
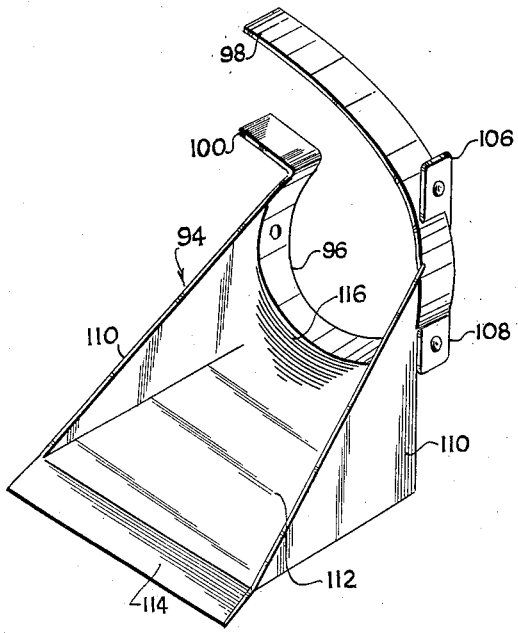
Fig. 16 is a slightly enlarged, perspective view of the snow plow conversion device, per se.
Figure 15:
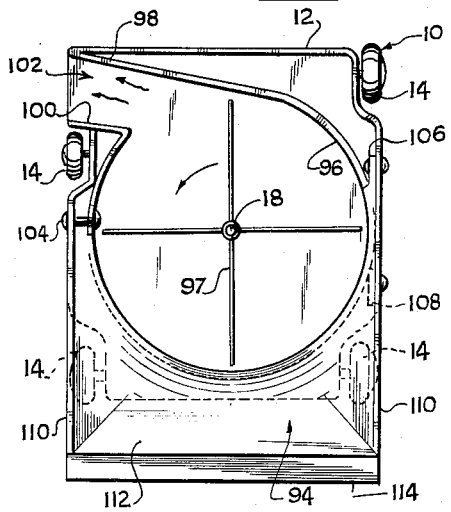
Fig. 15 is an elevational view of the mower converted for use as a snow plow, as seen from the left of Fig. 14.

In Figs. 14–16, there is shown a device for converting the lawn mower for use as a snow plow. The snow plow conversion device has been generally designated 94, and as shown in Fig. 16 to particular advantage, at one end has a circularly shaped portion 96 which is adapted to be extended into the housing 12 with the lawn mower vertically positioned as in Fig. 14. The portion 96 is curved for a substantial part of its length about the axis of rotation of the blade 20, and the purpose of this is to cause snow accumulated within the plow to be confined within the area of rotation of a rotary impeller 97 (Fig. 15), that is particularly shaped to scoop up the snow as it enters the housing 12, and move it by centrifugal action through a discharge channel, opening laterally of the mower. The portion 96, to this end, has at one end an extension 98 tangential to the portion 96 and extending to one side of the mower. At its other end, portion 96 has an extension 100 which is spaced from the extension 98, to cooperate therewith in forming a discharge conduit 102 through which the snow is forced during operation of the device. The particular shape of the impeller, the number of blades thereon, and other details of the impeller construction can be varied. It is mainly important that the impeller be one that is adapted to operate in snow, in a manner to throw the snow laterally through the conduit 102 without tendency on the part of the snow to clog in the device.

In any event, at one side of the mower the portion 96 is connected to the depending guard flange of the housing 12 by means of a screw or rivet 104 (Fig. 15). At the other side of the mower, there are shown coplanar, spaced ears 106, 108, respectively, integral or otherwise made rigid with the circular portion 96 of the snow plow, and apertured in registration with apertures formed in the adjacent side of the lawn mower guard flange, to receive rivets or screws whereby the entire snow plow is fixedly engaged with the housing in the position shown in Figs. 14 and 15.

Referring now to Fig. 16, integral with diametrically opposite portions of the circular portion 96 of the snow plow are approximately triangular side walls 110. These diverge in a direction forwardly from the mower, and extend upwardly from and are rigid with a bottom wall 112 which inclines in a direction downwardly from the mower, terminating at its forward end in a lip 114 that is adapted to be supported slidably upon the pavement or other surface from which the snow is being swept.

As will be noted, this provides a collecting receptacle for the snow, into which the snow will be forced responsive to movement of the entire structure forwardly along the area being swept. As the snow moves into the scoop defined by the walls 110, 112, it travels into the area in which the impeller 97 is rotating and is immediately caught up and discharged through conduit 102.

The scoop, at its forward end, is of U-shaped cross section with straight side and bottom walls. However, as the scoop nears its inner end, its cross-sectional shape is gradually changed to an arcuate cross section, merging into the curved member 96.

It will be seen, thus, that one need merely upend the mower in the position shown in Fig. 14, with handle 16 swung to a position opposite that in which it is usually disposed. This locates the handle 16 properly for pushing the mower forwardly, the mower traveling on what were formerly its rear wheels. Of course, in some makes, the mower may be rolling upon its front wheels and it is not intended that the invention be limited in this respect.

It is mainly important to note that the impeller is substituted for the blade 20, and with the mower positioned as shown, one can swiftly attach the snow shovel conversion device 94 to the housing 12, thereby converting the mower for use as a power snow shovel.

In all forms of the invention, there is a common characteristic wherein a conventional rotary lawn mower is swiftly and easily converted for a number of different purposes, as for example, a hedge trimmer, a rotary grinder, and a snow plow of the power-operated type. In each instance, the device to which the lawn mower is converted for use is power-driven, and considerable versatility is imparted to the lawn mower, as distinguished from its ordinary single-purpose use, namely cutting grass or mulching lawn debris.

The structures described as various types of devices, that can be used for effecting the desired conversion, might of course be varied according to different makes of lawn mowers, but have the adaptability that they can be used with a substantial number of different types of lawn mowers, operable with their blades either horizontally or vertically disposed, with minimum change in the lawn mower design, and with maximum facility so far as attaching or detaching the conversion device is concerned.

While I have illustrated and described the preferred embodiments of by invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. In a hedge trimmer the combination, with a rotary lawn mower including a housing and a blade, of a supporting structure including transversely spaced rails overlying the housing, crossbars extending between the rails, and hook means depending from the crossbars for hooking under opposite sides of the housing, said rails extending in parallel relation, the crossbars being slidably adjustable longitudinally of the rails to adjustably set the crossbars at a selected distance from each other, said hook means being adjustable longitudinally of the respective crossbars for locating the hook means selectively along the sides of the housing, the hook means comprising sleeves slidable and rotatable upon the crossbars, plates depending from and rigid with the sleeves, and upwardly turned hook flanges on the lower ends of the plates, said hook flanges being shiftable upwardly into engagement with the sides of the housing responsive to adjustment of the crossbars longitudinally of the rails and rotatable movement of the sleeves upon the respective crossbars.

2. In a hedge trimmer the combination, with a rotary lawn mower including a housing and a blade, of a support structure including transversely spaced rails overlying the housing, crossbars extending between the rails, and hook means depending from the crossbars for hooking under opposite sides of the housing, said rails extending in parallel relation, the crossbars being slidably adjustable longitudinally of the rails to adjustably set the crossbars at a selected distance from each other, said hook means being adjustable longitudinally of the respective crossbars for locating the hook means selectively along the sides of the housing, the hook means comprising sleeves slidable and rotatable upon the crossbars, plates depending from and rigid with the sleeves, and upwardly turned hook flanges on the lower ends of the plates, said hook flanges being shiftable upwardly into engagement with the sides of the housing responsive to adjustment of the crossbars longitudinally of the rails and rotatable movement of the sleeves upon the respective crossbars, said lawn mower including hook-shaped brackets fixedly secured to the lawn mower adjacent opposite sides thereof and adapted to interengage with the hook flanges, for connection of a selected hook flange to a selected bracket, whereby to support the lawn mower with its blade rotating in a generally vertical plane for trimming the sides of the hedge.

References Cited in the file of this patent

UNITED STATES PATENTS

| | | |
|---|---|---|
| 508,936 | Goss | Nov. 21, 1893 |
| 1,627,258 | Sullivan | May 3, 1927 |
| 1,869,394 | Sikma | Aug. 2, 1932 |
| 2,545,399 | Watkins | Mar. 13, 1951 |
| 2,573,377 | Wolbaum | Oct. 30, 1951 |
| 2,779,112 | Garland | Jan. 29, 1957 |
| 2,785,482 | Croce et al. | Mar. 19, 1957 |
| 2,798,354 | O'Brien et al. | July 9, 1957 |

FOREIGN PATENTS

| | | |
|---|---|---|
| 724,107 | Great Britain | Feb. 16, 1955 |